(12) United States Patent
Wright et al.

(10) Patent No.: US 9,725,080 B1
(45) Date of Patent: Aug. 8, 2017

(54) PARKING BRAKE SYSTEM FOR LOCOMOTIVE

(75) Inventors: Eric C. Wright, Evans Mill, NY (US); Howard E. Huber, Jr., Black River, NY (US)

(73) Assignee: NEW YORK AIR BRAKE CORPORATION, Watertown, NY (US)

(*) Notice: Subject to any disclaimer, the term of this patent is extended or adjusted under 35 U.S.C. 154(b) by 568 days.

(21) Appl. No.: 12/632,049

(22) Filed: Dec. 7, 2009

Related U.S. Application Data

(60) Provisional application No. 61/146,920, filed on Jan. 23, 2009.

(51) Int. Cl.
*B60T 13/74* (2006.01)
*B60T 13/46* (2006.01)

(52) U.S. Cl.
CPC .................. *B60T 13/465* (2013.01)

(58) Field of Classification Search
CPC .... B60T 13/263; B60T 13/266; B60T 13/365; B60T 13/465; B60T 13/665; B60T 15/16; B60T 15/54; B60T 15/58; B60T 15/184; B60T 15/185; B60T 15/187; B60T 15/188; B60T 15/304; B60T 15/306; B60T 17/043; B60T 17/228; B60T 17/08; B61H 9/006; F15B 15/262
USPC .............................................. 303/3, 4, 7, 15
See application file for complete search history.

(56) References Cited

U.S. PATENT DOCUMENTS

| | | | | |
|---|---|---|---|---|
| 3,597,016 A | * | 8/1971 | Gachot | B60T 13/36 188/265 |
| 4,593,954 A | * | 6/1986 | Campanini | B60T 13/268 303/7 |
| 4,746,171 A | * | 5/1988 | Engle | B61H 13/02 188/107 |
| 5,172,316 A | | 12/1992 | Root et al. | |
| 5,558,412 A | * | 9/1996 | Kanjo | B60T 7/18 303/74 |
| 5,564,795 A | * | 10/1996 | Engle | B60T 13/665 303/27 |
| 5,738,416 A | | 4/1998 | Kanjo et al. | |
| RE36,036 E | * | 1/1999 | Engle | B60T 13/665 303/15 |
| 6,098,006 A | | 8/2000 | Sherwood et al. | |
| 6,126,245 A | * | 10/2000 | Barber | B60T 13/665 303/15 |
| 6,325,464 B2 | * | 12/2001 | Truglio | B60T 13/665 303/15 |
| 6,457,782 B1 | * | 10/2002 | Truglio | B60T 13/665 303/15 |
| 6,854,570 B2 | * | 2/2005 | Connell | B60T 13/365 188/170 |
| 2002/0017439 A1 | * | 2/2002 | Hill | B60T 13/665 188/107 |
| 2005/0092563 A1 | | 5/2005 | McCann et al. | |

(Continued)

*Primary Examiner* — Bradley King
*Assistant Examiner* — San Aung
(74) *Attorney, Agent, or Firm* — Bond Schoeneck and King PLLC; David Nocilly

(57) ABSTRACT

A locomotive brake system includes a brake cylinder with an integrated parking brake; a main reservoir; and a brake system controller for controlling the pressure in the brake cylinder. The brake system uses main reservoir pressure to pressurize the brake cylinder to achieve the parking brake output force using the brake cylinder.

4 Claims, 3 Drawing Sheets

(56) References Cited

U.S. PATENT DOCUMENTS

2008/0106144 A1* 5/2008 Schrader ............... B60T 17/16
 303/87
2010/0084228 A1* 4/2010 Iraschko ............... B60T 17/086
 188/106 F

* cited by examiner

BRAKE CYLINDER WITH PARKING BRAKE

| STATE | PARK PILOT PRESSURE | BRAKE CYLINDER PRESSURE | LOCK STATE |
|---|---|---|---|
| RELEASE | MR > 65 PSIG | 0 | UNLOCKED |
| SERVICE BRAKE/EMERGENCY | MR > 65 PSIG | SERVICE BRAKE/EMERGENCY | UNLOCKED |
| PARK BRAKE APPLIED | 0 | MR | LOCKED |
| PARK BRAKE APPLIED | 0 | MR LEAKS TO ZERO | LOCKED |
| PARK BAKE RELEASE | MR > 65 PSIG | 0 | UNLOCKED |
| NOTE | THERE IS A ONE TIME MANUAL PARKING BRAKE RELEASE. TO RE-APPLY PARKING BRAKE CYLINDER PRESSURE MUST BE APPLIED. | | |

FIG. 3

PARKING BRAKE SYSTEM FOR LOCOMOTIVE

BACKGROUND AND SUMMARY

The present locomotive brake system is directed to a combined brake cylinder and parking brake. An example is shown in US published application US 2005/0092563 dated May 5, 2005.

For this arrangement, the parking brake lock mechanism is located to the pressurized side of the brake cylinder, which allows the use of a conventional hollow rod to support the brake cylinder push rod. The parking brake lock actuating rod is loosely connected to the pressure side of the brake cylinder piston, so that when actuated it prevents the release of the pneumatic brake force, while the "loose" connection allows for some misalignment during operation, preventing unnecessary wear or binding.

In the present locomotive brake cylinder with parking brake lock is a locomotive brake cylinder with a parking brake locking mechanism to provide a parking brake function. The parking brake locking mechanism mechanically locks the brake cylinder in the applied position after a pneumatic brake application from the locomotive brake system. The parking brake locking mechanism is controlled by a pneumatic pilot signal from a main reservoir on the locomotive. The parking brake is enabled when the pilot pressure is removed, and disabled and/or released when the pilot pressure is applied.

The present locomotive brake system includes: a brake cylinder with an integrated parking brake; a main reservoir; and a brake system controller for controlling the pressure in the brake cylinder. The brake system uses main reservoir pressure to pressurize the brake cylinder to achieve the parking brake output force using the brake cylinder.

These and other aspects of the present system will become apparent from the following detailed description of the system, when considered in conjunction with accompanying drawings.

BRIEF DESCRIPTION OF THE DRAWINGS

FIG. 3 illustrates the various conditions of operation of the locomotive parking brake system according to the present invention.

DETAILED DESCRIPTION

Figure 1:
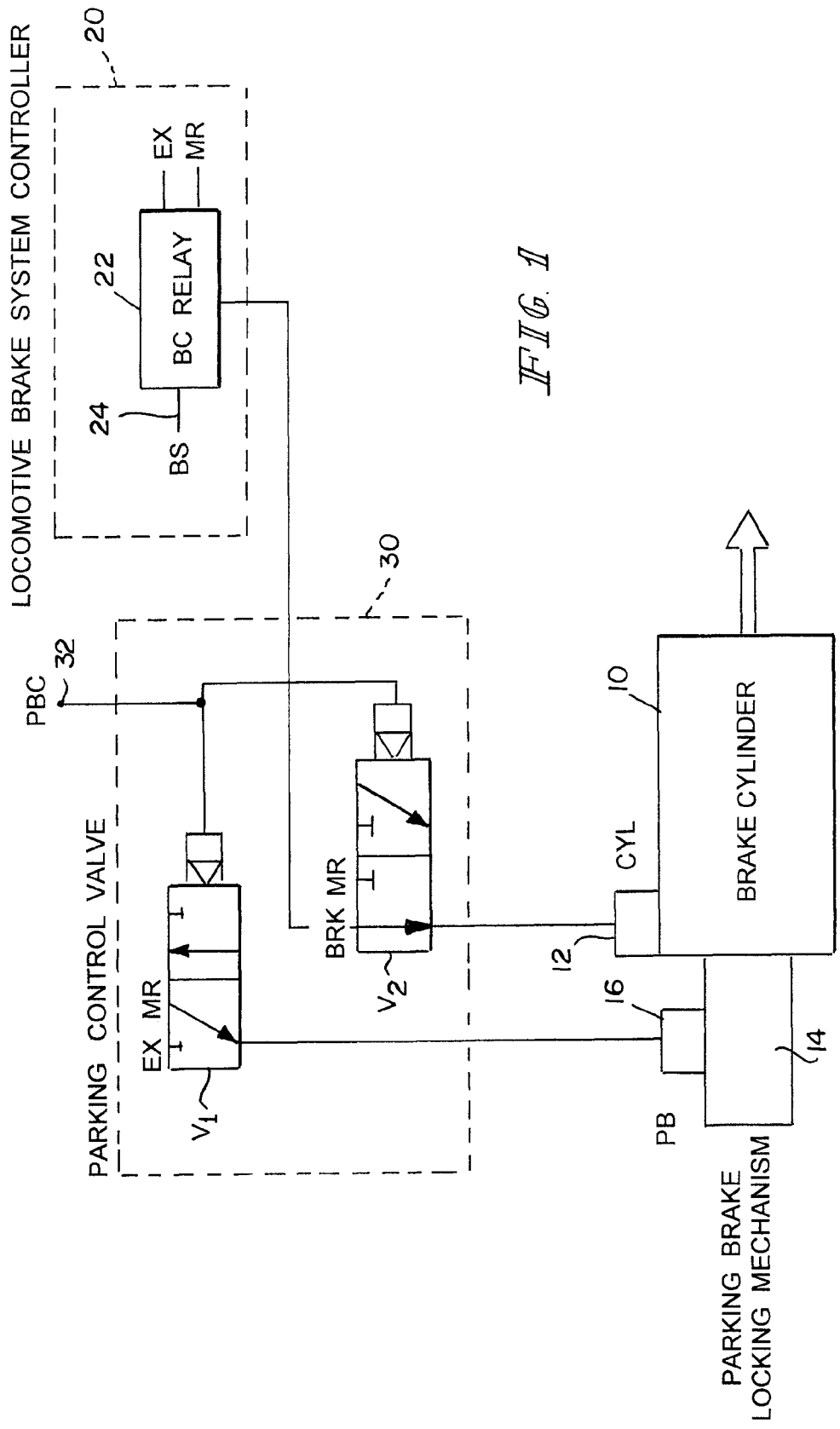
FIG. 1 is a schematic of a first embodiment of a locomotive parking brake according to the present disclosure.

As illustrated in FIG. 1, the brake cylinder 10 has a port 12 and includes a parking brake locking mechanism 14 with a port 16. A locomotive brake system controller 20 includes a brake cylinder relay 22 which provides a brake pressure to the brake cylinder 10 from the main reservoir MR proportional to a brake signal BS or release using exhaust EX. The locomotive brake system controller may be a CCB® brake system from New York Air Brake and shown in U.S. Pat. Nos. 5,172,316 and 6,098,006 or any other system.

An electrically controlled parking brake control valve 30 is provided and includes a solenoid valves V1 and V2. In a first position shown in FIG. 1, the solenoid valve V1 applies main reservoir pressure to the parking brake lock pilot port 16 and simultaneously via solenoid valve V2 connects the brake cylinder port 12 to the brake cylinder signal BRK from the brake cylinder relay 22 of the locomotive brake system controller 20. This first position provides parking brake release and normal pneumatic brake function. In a second position, the valve V1 will vent the parking brake lock pilot port 16 to atmosphere and valve V2 will pressurize the pneumatic brake cylinder port 12 with main reservoir pressure MR.

The parking brake lock mechanism 14 will mechanically lock the brake cylinder 10 at the full output force, even if the MR pressure to the brake cylinder 10 is subsequently exhausted. The parking brake will be released when the parking control valve 30 is commanded back to the first position. The parking control valve 30 is responsive to the parking brake lock signal PBC at 32 from an operator input. The various conditions of operation are shown in FIG. 3.

Unlike the parking brake lock for rail cars, main reservoir pressure MR is used to energize the system to provide higher parking brake forces than would be possible with typical service and emergency brake pressures from the brake cylinder relay valve 22. By using the main reservoir pressure MR as the actuating pressure, a very compact, high output automatic parking brake is achieved. Further, because the brake cylinder signal BRK is controlled by the locomotive brake system controller 20, like CCB® brake system, which provides closed loop pressure control of the brake pressure, any undesired main reservoir leakage from the parking control valve 30 to the brake cylinder 10 will be automatically exhausted by the locomotive brake system controller 20, making the system very fault tolerant.

Figure 2:
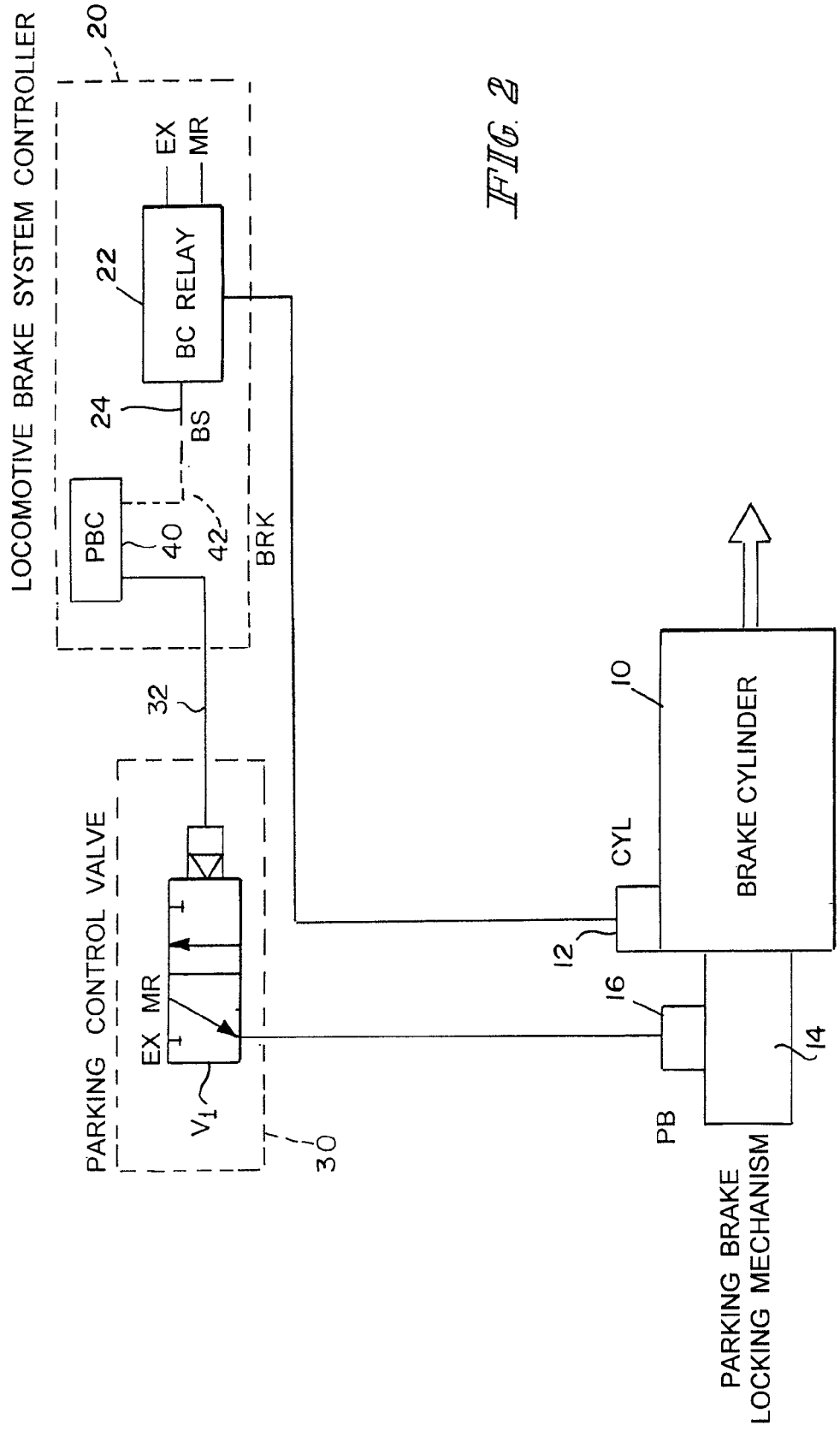
FIG. 2 is a schematic of a second embodiment of a locomotive parking brake according to the present disclosure.

As further embellishment of the parking brake system for locomotive according to the present invention is illustrated in FIG. 2, when the brake cylinder 10 with parking locking mechanism 14 is installed on a locomotive that is also equipped with the locomotive brake system controller 20 (e.g., a computer controlled brake system, then the locomotive brake system controller 20 could be commanded by an electrical switch PBC 40. PBC 40 may be operated by the driver, via dotted line 42 to pressurize the brake cylinder to MR pressure, or other selected pressure as needed to provide the required parking brake force, directly from the brake cylinder relay 22. The parking brake lock pilot pressure could similarly be controlled by the locomotive brake system controller 20 using the solenoid valve V1. The solenoid valve V2 is eliminated.

Integrating the control PBC 40 of the parking brake with the locomotive brake system controller 20 also reduces the opportunity for operator error by integrating two otherwise independent systems and providing the necessary interlocks and diagnostics to prevent the inadvertent attempt to drive the locomotive with the parking brake set, for example. In addition, the parking brake application and release could be controlled by the operator through the existing operator display screen, thus eliminating unnecessary wires, switches, sensors, etc. Thus, by integrating the function of the parking brake with the locomotive brake system controller 20, the function of the parking brake lock control valve 30 is provided in a less costly way.

On a parked, "dead" locomotive, without sufficient MR pressure, the parking brake can be manually released with a ¼-turn release nut. In this case, each parking brake locking mechanism 14 on the locomotive would have to be independently released manually. The parking brake locking mechanism 14 automatically resets when it is re-pressurized.

Although the present system has been described and illustrated in detail, it is to be clearly understood that this is done by way of illustration and example only and is not to be taken by way of limitation. The scope of the present system is to be limited only by the terms of the appended claims.

The invention claimed is:

1. A locomotive parking brake system comprising:
   a brake cylinder having a pressurized side and a hollow rod moveable between a released position and an applied position;
   a source of main reservoir pressure;
   a locomotive brake system controller for providing a cylinder brake signal to the brake cylinder;
   a parking brake lock having a port and being coupled to the pressurized side of the brake cylinder to mechanically lock the brake cylinder in an applied position in the absence of any main reservoir pressure at the port; and
   a first valve that is moveable in response to a parking brake lock signal between a first position, where the source of main reservoir pressure is supplied directly to the port of the parking brake lock, and a second position, where the port of the parking brake lock is connected to exhaust.

2. The system of claim 1, further comprising a second valve connected between the locomotive brake system controller and the brake cylinder that is moveable in response to the parking brake lock signal between a first position, where the cylinder brake signal is communicated to the brake cylinder and a second position, where the source of main reservoir pressure is connected directly to the brake cylinder.

3. The system of claim 2, wherein the parking brake lock signal causes the first and second valves to move into their respective second positions, thereby directly connecting main reservoir pressure directly to the brake cylinder and exhausting the port of the parking brake lock.

4. The system of claim 1, further comprising a release nut for manually releasing the parking brake lock.

* * * * *